United States Patent [19]

Tonn

[11] 4,395,667

[45] Jul. 26, 1983

[54] NON-LINEAR CONTROL ARRANGEMENT FOR PRINTING MACHINES

[75] Inventor: Klaus Tonn, Leipzig, German Democratic Rep.

[73] Assignee: VEB Kombinat Polygraph Werner Lamberz: Leipzig, Leipzig, German Democratic Rep.

[21] Appl. No.: 283,019

[22] Filed: Jul. 8, 1981

[30] Foreign Application Priority Data

Jul. 25, 1980 [DD] German Democratic Rep. .... 222867

[51] Int. Cl.³ .............................................. H02P 5/00

[52] U.S. Cl. ..................................... 318/309; 318/295

[58] Field of Search ............... 318/294, 295, 301, 306, 318/309, 342, 504

[56] References Cited

U.S. PATENT DOCUMENTS

| | | | |
|---|---|---|---|
| 3,047,788 | 7/1962 | Schurr | 318/309 X |
| 3,318,998 | 5/1967 | Kihara | 318/301 X |
| 3,421,027 | 1/1969 | Maynard et al. | 318/309 X |
| 4,283,666 | 8/1981 | Kemmel | 318/342 X |

*Primary Examiner*—J. V. Truhe

*Assistant Examiner*—W. E. Duncanson, Jr.

*Attorney, Agent, or Firm*—Michael J. Striker

[57] ABSTRACT

A non-linearly operating control arrangement for driving units, such as those of damping devices of printing machines, includes a plurality of parallel resistance-diode bridges having two inputs and two outputs, a pair of resistors interposed between one of the inputs and the respective outputs, and a potentiometer interposed between the outputs and having a wiper connected to the other input via a diode. The first outputs of all bridges are connected to the input of a summation member and the output of the latter, together with the second outputs of all bridges, is connected to the input of an amplifier whose output voltage controls the driving unit speed of rotation. Comparison potentials of different magnitudes are supplied to the second inputs of the bridges from a series of additional potentiometers respectively associated with the bridges. Another potentiometer is provided which supplies additional potential to the input of the amplifier. The potentiometers are arranged in a clear correlation with one another on a setting panel.

6 Claims, 4 Drawing Figures

NON-LINEAR CONTROL ARRANGEMENT FOR PRINTING MACHINES

BACKGROUND OF THE INVENTION

The present invention relates to a non-linear control arrangement for driving units in general, and more particularly to a control arrangement for use in printing machinery, such as the damping device driving unit control arrangement.

Especially in offset printing, the correct operation of the damping device has a considerable influence on the quality of the printed matter. Inasmuch as the consumption of the damping liquid depends to a high degree on the printing speed, the printing cylinder speed of rotation can be used as a guiding value in the automatic control of the driving arrangement of the damping device.

However, the relationships between the printing cylinder speed of rotation and the demand for the damping liquid, on the one hand, and between the damping duct roller speed of rotation and the amount of the damping liquid being fed thereby, on the other hand, are not linear. For this reason, is is necessary or at least advantageous to equip a control arrangement for the damping device with a circuitry which renders it possible to modify the input signal, which is representative of the speed of rotation of the printing cylinder, in such a manner as to obtain at the output of the control arrangement a control potential or voltage which is in the required non-linear relationship to the input signal that is needed for correctly controlling the damping device.

The need for such a non-linear control has already been recognized and a solution to this problem has been presented, for instance, in the Swiss Pat. No. 543,396. This patent discloses a damping device control arrangement for an offset printing machine wherein a resistance matrix is being used for the formation of non-linear functions. This resistance matrix converts a given mechanical signal, which is applied to the wiper of the input potentiometer, into an electrical output signal which varies in accordance with the adjustment of a plurality of connecting elements for rails which cross one another.

The input potentiometer is connected with the output potentiometer of this conventional matrix via the connecting elements in that the adjustable connecting elements themselves connect, via crossing rails, a plurality of vertical rails, which are electrically connected, at regularly spaced intervals, with the input potentiometer, with a corresponding plurality of horizontal rails which are electrically connected, at regularly spaced intervals, with the output potentiometer. The adjustment of the connecting elements is accomplished in such a manner that the electric output signal varies in accordance with a predetermined non-linear function.

The electrical connection of the rails with the potentiometers at regularly spaced intervals means that one connecting element is needed for each point of the respective interval of the curve to be simulated. This is true even if the slope of the curve is the same for a portion of the curve. This technical requirement for providing a separate connecting element for each point of the curve is reflected in the size and clarity of arrangement of the matrix. Any function values which are situated between the points that are determined by the construction of the particular matrix can be represented only if the matrix is expanded. For achieving accurate simulations of the individual curve sections, even the remaining part of the matrix must be made correspondingly large.

Thus, it may be seen that the above-discussed resistance matrix is disadvantageous in several respects in that it permits the achievement of an accurate simulation of the functional relationships between the aforementioned factors only at the expense of a substantial cost, diminishment of the clarity of arrangement, and increase in the amount of available space which must be set aside for the resistor matrix. In addition thereto, the adjustment or the operation of the arrangements of this type is quite complicated.

SUMMARY OF THE INVENTION

Accordingly, it is a general object of the present invention to avoid the disadvantages of the prior art.

More particularly, it is an object of the invention to provide a non-linearly operating control arrangement, especially for controlling the damping device of a printing machine, which is not possessed of the drawbacks of the conventional controlling arrangement of this type.

Still another object of the present invention is to so construct the non-linearly operating control arrangement of the type here under consideration as to improve its accuracy, simplify its construction, and improve the clarity of its arrangement as compared to the conventional arrangement of this type.

It is a further object of the invention to develop a non-linear control arrangement which is capable of simulating any arbitrarily selected function curves and in which the neighboring points of the curve with the same slope can be obtained by a single adjustment of the correcting member.

In pursuance of these objects and others which will become apparent hereafter, one feature of the present invention resides in a non-linear control arrangement for a driving unit, particularly for use in printing machinery, which, briefly stated, comprises a source of a basic electrical signal; means for producing a control signal non-linearly dependent on the basic signal, including a plurality of adjustable resistor-diode bridges coupled in parallel to one another and each having a first and a second input and a first and a second output, a pair of resistors respectively coupled between the first input and the first and second outputs, an adjustable potentiometer coupled between the outputs and having a wiper connected to the second input, and a diode interposed between the wiper and the second input, the first inputs being connected in parallel from the basic signal source, the producing means further including a source of a plurality of electrical potential, including a plurality of additional adjustable potentiometers respectively associated with the bridges and connected to the second inputs thereof, a summation member having an input and an output, and an amplifier having an input and an output, the first outputs of the bridges being connected to the summation member input and the second outputs of the bridges and the summation member output being connected to the amplifier input; and means for controlling the speed of rotation of the driving unit connected from the amplifier output. The arrangement of the present invention is especially advantageous when it further includes, in accordance with a further aspect of the invention, an additional adjustable source of electrical potential which is also connected to the amplifier input.

The construction of the summation member is particularly simple when it is constructed as an operational amplifier, and when a plurality of additional resistors is provided, each additional resistor being interposed between one of the first outputs and the operational amplifier input.

In order to be able to shift the entire characteristic curve and to amplify the output or control signal, an advantageous construction of the arrangement is obtained when the amplifier is an operational amplifier, when a plurality of auxiliary resistors is provided, each auxiliary resistor being interposed between one of the second bridge outputs and the operational amplifier input, and when potential-controlling means including an auxiliary potentiometer is connected to the operational amplifier input.

An improvement in the clarity of arrangement and a simple operation and handling is achieved, in an advantageous manner, in that a setting panel is provided on which the potentiometers are supported, the adjustable potentiometers of the bridges being advantageously constructed as sliding control potentiometers, and the additional adjustable potentiometers being arranged on the setting panel in a readily recognizable correlation with the respectively associated ones of the sliding control potentiometers.

The above-discussed construction of the non-linear control arrangement renders it possible to simulate any arbitrary function curves, in that the slopes of the consecutive curve sections can be adjusted and the corresponding values can be adjusted on the axis of the independently variable value of the coordinate system in each instance.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENT

Figure 1:
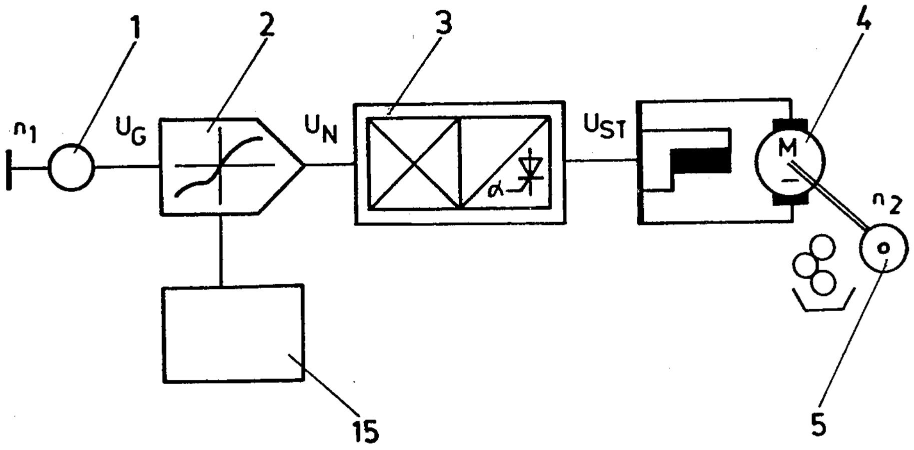
FIG. 1 is a diagrammatic view of a control system for a damping duct roller of a printing machine, incorporating a non-linear control arrangement according to the present invention.

Referring now to the drawing in detail, and first to FIG. 1 thereof, it may be seen that it includes a rotational speed measuring device 1 which measures the speed or rotation of the main driving shaft or of the printing cylinder of a printing machine and generates an output voltage $U_G$ which is proportional to this speed. A non-linear correcting or control arrangement 2 receives the output voltage $U_G$ and generates a corrected voltage $U_N$ which is needed for the correct control of the speed or rotation of a damping duct roller 5 of a damping device for the printing machine. As will become apparent hereafter, a different value $n_2$ of the speed of rotation of the damping duct roller 5 is obtained for each different speed of rotation $n_1$ of the main shaft or printing roller of the printing machine, and the progression of the values of $n_2$ is non-linear except possibly in short sections of the characteristic curve. The behavior of the characteristic curve is simulated in the correcting arrangement 2. The actual adjustment of the damping duct roller 5 in dependence on the output voltage $U_N$ of the correcting or control arrangement 2 is accomplished by a rotation speed adjuster 3 of a conventional construction which controls the speed or rotation of the rotor of a variable-speed electric motor 4 which rotates the damping duct roller 5 about its axis.

Figure 2:
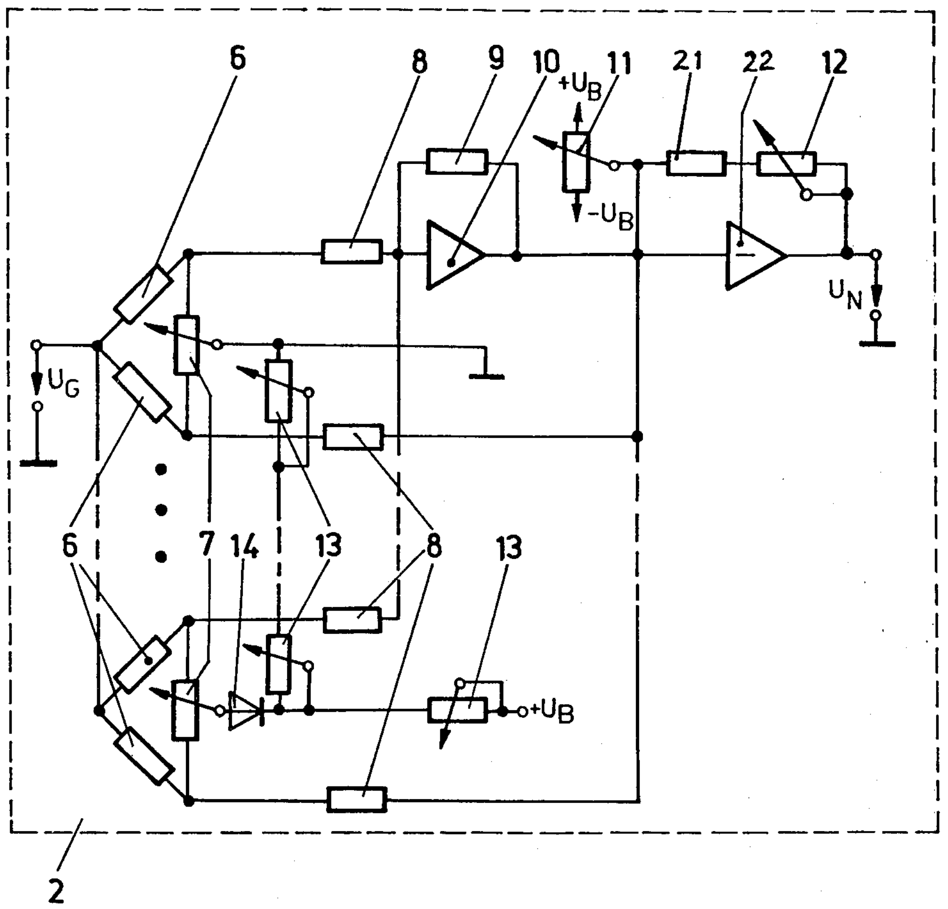
FIG. 2 is a simplified circuit diagram of the correction portion of the control arrangement of the invention.

Referring now to FIG. 2, it may be seen that is shows a simplified circuit diagram of the control arrangement 2. The output voltage $U_G$ which, as explained above, is produced by the measuring device 1, is supplied to one input of each of a plurality of resistor-diode bridges which are arranged in parallelism with one another. As also mentioned before, the voltage $U_G$ is proportional to the speed or rotation $n_1$ and, in the bridges, it constitutes a basic signal, that is, the signal which forms the basis for the generation of the corrected signal or voltage $U_N$.

Each of the bridges includes two resistors 6 and an adjustable potentiometer 7. The resistors 6 are respectively coupled between the one input and a respective one of two outputs of the bridge, and the potentiometer 7 is coupled between the two outputs of the bridge. The potentiometer 7 includes a wiper which is positionally adjustable and thus determines the value of two additional resistances in the bridge which are constituted by the sections of the potentiometer winding or the like which are situated between the wiper and the respective bridge output. The position of the wiper thus determines the slope of the respective characteristic line. The bridge also has another input which is connected to the wiper of the respective potentiometer 7.

A comparison voltage or potential is supplied to the other input of the bridge. Without resorting to further measures, an electric potential would be present at the other input either if the voltage at the one input were higher or if it were lower than the comparison voltage. In order to achieve that only that voltage range which exceeds the comparison potential is effective at the bridge, a diode 14 is interposed between the potentiometer 7 and another potentiometer 13 which forms an adjustable part of a voltage or potential divider for each of the bridges. Thus, the diode 14, together with the respective potentiometer or potentiometers 13, determine the range in which the respective bridge becomes effective, while the potentiometer 7 of the respective bridge determines the slope of the characteristic line of the respective bridge, as mentioned before. The slope of the characteristic line is expressed in the terms of voltage or potential at the respective outputs of the bridge.

The individual currents from the first outputs of all of the bridges are fed, through respective resistors 8, to an input of a first operational amplifier 10, where they are added to form a composite current. The resistors 8, the operational amplifier 10, and a feedback resistor 9 coupled between the output and the input of the operational amplifier 10 together constitute a so-called summation member. The composite current appearing at the output of the operational amplifier 10 is then supplied to a second operational amplifier 22, together with the currents from the second outputs of the bridges. The second amplifier 22 amplifies this current and, together with a feedback resistor in the form of an adjustable potentiometer 12 which is coupled between the output and the input of the second amplifier, in series with another resistor 21, determines the value of the voltage $U_N$ which is needed for the proper control of the rotational speed $n_2$ for each value of the voltage $U_G$ and thus of the speed $n_1$.

An additional potential $U_B$ is superimposed with the above-discussed potentials supplied to the input of the operational amplifier 22, by beans of an auxiliary adjustable potentiometer 11. In this manner, the value of the combined current at the input of the second operational amplifier 22 can be changed without changing the characteristic behavior of the curve. In other words, the curve is merely shifted up and down as seen in FIG. 3, depending on the adjustment of the wiper of the potentiometer 11, without changing its shape.

Figure 3:
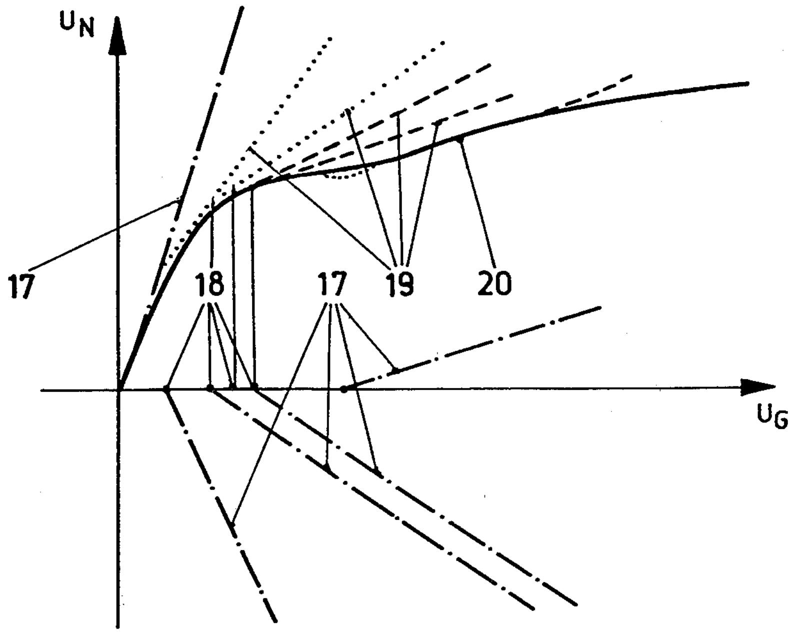
FIG. 3 is a graphic representation of the characteristic lines and curves.

FIG. 3 shows how the individual characteristic lines 17 of the respective bridges are added, in consecutive sections 19, to obtain a combined characteristic curve 20. The points at which the respective bridges become effective are indicated at 18 and are determined by the adjustment of the wipers of the potentiometers 13 and thus by the values of the respective comparison potentials. The momentary slope of the characteristic curve 20 is determined by the individual slopes of the characteristic lines 17 which are then in effect.

Figure 4:
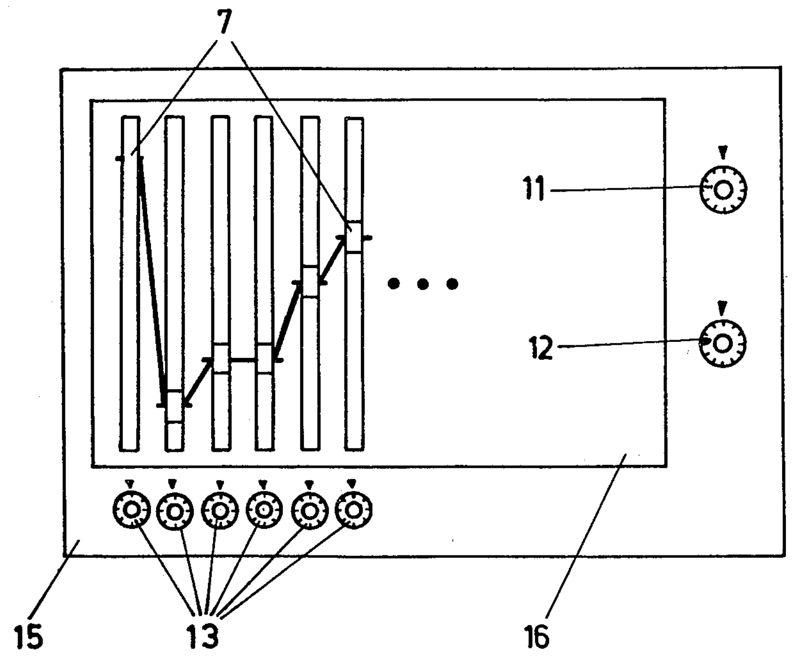
FIG. 4 is a diagrammatic front elevational view of a setting panel supporting the control arrangement of the invention.

In FIG. 4, there is illustrated a setting panel or board 15 on which the respective potentiometers 7, 11, 12 and 13 are supported. The potentiometers 7 constitute shifting control potentiometer device 16 and, as mentioned above, they serve to determine the slope of the respective characteristic line 17 in each instance. As also already mentioned, the magnitudes of the respective comparison voltages for the respective bridges, that is, the points 18 at which the respective bridges become effective, are determined by the potentiometers 13 which are arranged underneath the respectively associated shifting control potentiometers 16 in order to obtain a clearly arranged correlated distribution of the potentiometers 13 and 7.

While the desired characteristic curve 20 for the particular run can be obtained by experimentation, it is also possible and advantageous, as proposed in accordance with another facet of the present invention, to prepare a pattern sheet or plate and to use the same for adjusting the positions of the potentiometers 13 and of the shifting control potentiometers 16, preferably by superimposing the pattern sheet or plate onto the setting panel 15.

It will be understood that each of the elements described above, or two or more together, may also find a useful application in other types of machines differing from the type described above.

While the invention has been illustrated and described as embodies in a non-linear control arrangement for use in printing machines for controlling the speed of rotation of the damping duct roller, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. A non-linear control arrangement for a driving unit, particularly for use in printing machinery, comprising a source of a basic electrical signal; means for producing a control signal non-linearly dependent on said basic signal, including a plurality of adjustable resistor-diode bridges coupled in parallel to one another and each having a first and a second input and a first and a second output, a pair of resistors respectively coupled between said first input and said first and second outputs, an adjustable potentiometer coupled between said outputs and having a wiper connected to said second input, and a diode interposed between said wiper and said second input, said first inputs being connected in parallel from said basic signal source, said producing means further including a source of a plurality of electrical potentials, including a plurality of additional adjustable potentiometers respectively associated with said bridges and connected to said second inputs thereof, a summation member having an input and an output, and an amplifier having an input and an output, said first outputs of said bridges being connected to said input of said summation member and said second outputs of said bridges and said output of said summation member being connected to said input of said amplifier; and means connected from said output of said amplifier for controlling the speed of rotation of the driving unit.

2. The arrangement as defined in claim 1; and further comprising an adjustable source of an additional electrical potential connected to said input of said amplifier.

3. The arrangement as defined in claim 1, wherein said summation member includes an operational amplifier; and further comprising a plurality of additional resistors each interposed between one of said first outputs and said input of said operational amplifier.

4. The arrangement as defined in claim 1, wherein said amplifier is an operational amplifier; and further comprising a plurality of auxiliary resistors each interposed between one of said second outputs and said input of said operational amplifier, and means for controlling the potential, including an auxiliary potentiometer connected to said input of said operational amplifier.

5. The arrangement as defined in claim 1; and further comprising means for supporting said producing means, including a setting panel supporting said potentiometers.

6. The arrangement as defined in claim 5, wherein said adjustable potentiometers of said bridges are constructed as sliding control potentiometers; and wherein said additional adjustable potentiometers are arranged on said setting panel in a recognizable correlation with the respectively associated ones of said sliding control potentiometers.

* * * * *